Gillson & Palmer,

Cotton Picker.

No. 4312. Reissued Mar: 28. 1871.

Witnesses,
H. H. Doubleday
N. B. Smith

Inventors:
Gillson & Palmer
by their Attorney
A. M. Smith

N. FETERS, PHOTO-LITHOGRAPHER, WASHINGTON, D. C.

UNITED STATES PATENT OFFICE.

WILLIAM C. JILLSON AND AMOS B. PALMER, OF WILLIMANTIC, CONN.

IMPROVEMENT IN MACHINES FOR OPENING COTTON.

Specification forming part of Letters Patent No. 110,368, dated December 20, 1870; Reissue No. 4,312, dated March 28, 1871.

*To all whom it may concern:*

Be it known that we, WILLIAM C. JILLSON and AMOS B. PALMER, of Willimantic, county Windham, State of Connecticut, have invented certain new and useful Improvements in Cotton-Openers, of which the following is a full, clear, and exact description, reference being had to the accompanying drawings, making part of this specification.

The object of the invention is to open or loosen up and clean the cotton without injury to the staple, and leave it in a condition to be easier worked by the aid of other subsequent machinery; and it consists in two or more reels or spiders provided with loose or movable whippers, and combined with two or more shells or concaves, as will be fully described hereafter. These loose whippers or pivoted arms are attached on the four opposite sides of the circumference of the skeleton drums or pulleys alternately, and when the skeleton drums or spiders are in rapid revolution are thrown out in radial lines by centrifugal force.

Figure 1:
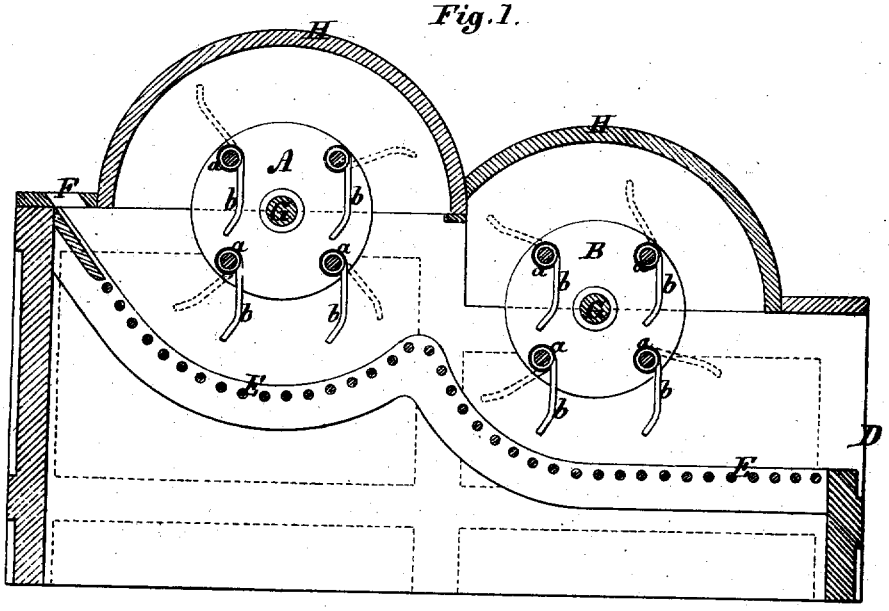
Figure 2:
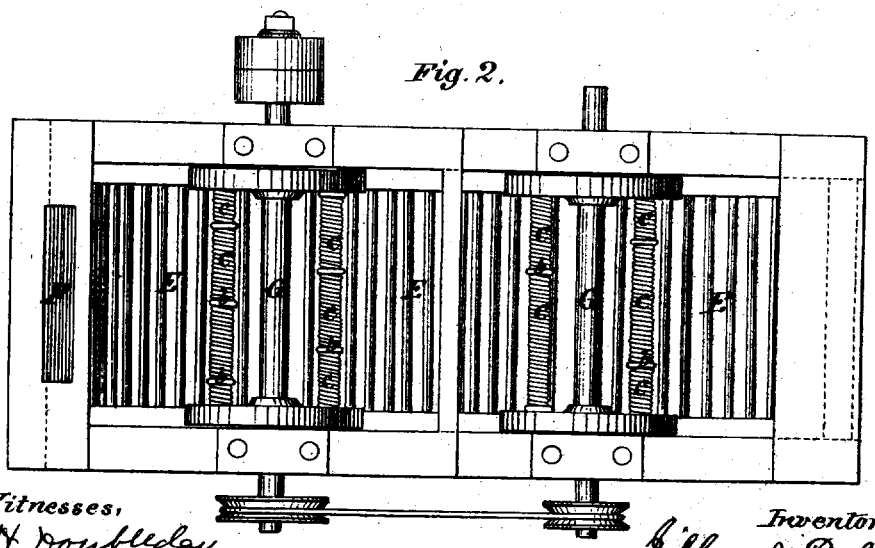

In the drawings, Figure 1 is a longitudinal sectional view of the machine; Fig. 2, an upper plan view, with the covering hoods or bonnets removed.

A B are sections of the skeleton drums.

*a a* are the cross-bars connecting the drum-heads, and upon which the whippers are hung.

*b b* are the whippers bent at one end to form an eye, which eye is slipped over the cross-bars before the drum is put together. The dotted lines show the whippers in motion.

C C are coils of wire or washers, also slipped over the cross-bars, and which serve to regulate the distance at which the whippers are to be set from each other.

F is a slot in the machine-frame through which the cotton may pass, and this may or may not be furnished with feed-rolls, as desired.

G G are the central shafts of the skeleton drums, and are journaled properly in the side of the machine frame or casing.

E E are open screens beneath the drum.

H H are the bonnets or hood, which form the upper portion of the cylinder inclosing the whippers.

The operation of this machine will be readily understood. The cotton is passed in at F, and the whippers loosen or lighten it up, and in turn pass it out at D; or, if desired, it can be passed out between two rollers and over an apron. Each one of these arms being independently attached, if either of them is clogged or filled up it does not affect the working of the others, thus the fiber of the cotton cannot cannot possibly be torn or injured.

We are aware that revolving shafts with radial projecting arms are old in cotton-openers; but their operation was very imperfect for two reasons, first, because from their being rigid and unyielding they injured the staple by breaking it, and thus shortened it to such an extent as to largely diminish its value; and, secondly, on account of their rigidity, they would sometimes, when they come in contact with stones or bits of iron, which are frequently found in raw cotton, set the machine on fire. These two defects, which so seriously impaired the usefulness of this class of machines, are entirely obviated by pivoting the whippers, as the whippers will readily yield when they meet with an obstruction, and the strength of the blow which is struck by the arms will be regulated by the weight and velocity of the whippers independently of the weight or velocity of the drum.

We are also aware that a long thin piece of metal has been loosely hung on a drum for opening cotton; but these latter are very objectionable for the reason that cotton clogging at any one point on the bar affects the entire bar, and thus the staple is torn and injured; but we are not aware of any cotton-opener in which drums with loosely-pivoted whipping rods or arms are used.

Having now described the invention, what is claimed as new, and sought to be secured by Letters Patent, is—

1. In a machine for opening cotton, the combination of revolving pivoted whipper rods or arms and an inclosing shell or case for confining the cotton while being acted upon by the whippers, all substantially as described.

2. In a machine for opening cotton, two or more reels or pulleys provided with hinged or pivoted whipping-rods, in combination with two or more shells or concaves, these parts being constructed and arranged substantially as shown and described, whereby the cotton after being partially opened by the first set of whippers shall be fed to the second set of whippers by the action of the first, substantially as set forth.

3. In combination with the whipper rods and reel bars, constructed as shown, the elastic sleeves for separating the whipper-rods and allowing them to yield laterally, substantially as set forth.

WM. C. JILLSON.
AMOS B. PALMER.

Witnesses:
ALLEN LINCOLN,
L. W. SPENCER.